United States Patent

Ueda et al.

[11] Patent Number: 5,910,211
[45] Date of Patent: Jun. 8, 1999

[54] INK FOR INK-JET RECORDING CONTAINING ALKYLENE OXIDE ADDUCT OF ACETYLENE GLYCOL

[75] Inventors: Takamasa Ueda, Ibaraki; Toshiya Natsuhara, Takarazuka; Masaki Asano; Hideo Hotomi, both of Nishinomiya, all of Japan

[73] Assignee: Minolta Co., Ltd., Osaka, Japan

[21] Appl. No.: 08/939,711

[22] Filed: Sep. 29, 1997

[30] Foreign Application Priority Data

| Oct. 1, 1996 | [JP] | Japan | 8-260605 |
| Oct. 1, 1996 | [JP] | Japan | 8-260608 |
| Oct. 1, 1996 | [JP] | Japan | 8-260615 |

[51] Int. Cl.$^6$ ................................. C09D 11/02
[52] U.S. Cl. ................ 106/31.43; 106/31.58; 106/31.75; 106/31.86
[58] Field of Search .............. 106/31.43, 31.58, 106/31.75, 31.86

[56] References Cited

U.S. PATENT DOCUMENTS

| 4,285,727 | 8/1981 | Uehara et al. | 106/31.58 |
| 4,299,630 | 11/1981 | Hwang | 106/31.58 |
| 4,325,735 | 4/1982 | Ohta et al. | 106/31.49 |
| 4,421,559 | 12/1983 | Owatari | 106/31.43 |
| 4,853,037 | 8/1989 | Johnson et al. | 106/31.58 |
| 5,108,503 | 4/1992 | Hindagolla et al. | 106/31.49 |
| 5,183,502 | 2/1993 | Meichsner et al. | 106/31.58 |
| 5,211,747 | 5/1993 | Breton et al. | 106/31.58 |
| 5,356,464 | 10/1994 | Hickman et al. | 106/31.58 |
| 5,395,434 | 3/1995 | Tochihara et al. | 106/31.43 |
| 5,397,386 | 3/1995 | Nakazawa et al. | 106/31.58 |
| 5,425,805 | 6/1995 | Botros et al. | 106/31.43 |
| 5,431,722 | 7/1995 | Yamashita et al. | 106/31.43 |
| 5,451,251 | 9/1995 | Mafune et al. | 106/31.43 |
| 5,514,208 | 5/1996 | Nagai et al. | 106/31.43 |
| 5,560,770 | 10/1996 | Yatake | 106/31.43 |

*Primary Examiner*—Helene Klemanski
*Attorney, Agent, or Firm*—McDermott, Will & Emery

[57] ABSTRACT

The present invention relates to an ink for ink-jetting, comprising: a coloring material, alkylene oxide adduct of acetylene glycol, water, and polyethyleneimine, alkali metal ethylenediaminetetraacetate or a mixture of NaOH with at least one compound selected from the group consisting of $NaHCO_3$ and $Na_2B_4O_7$.

37 Claims, No Drawings

INK FOR INK-JET RECORDING CONTAINING ALKYLENE OXIDE ADDUCT OF ACETYLENE GLYCOL

BACKGROUND OF THE INVENTION

1. Field of the Invention

The present Invention relates to an ink used in an ink-jet recording printer.

2. Description of the Prior Art

In general, an ink used in an ink-jet recording printer is the one with a coloring material dissolved or dispersed in a medium such as water, organic solvent and mixture thereof. A color ink, such as yellow, cyan, magenta, and black is used to replicate color images.

An ink for jet-recording is required to be excellent in antifoaming properties because air bubbles may be formed inside ink-flow channel in a recording head to cause dot-like defects in recorded images. Japanese Patent Laid-Open No. Hei 6-256696 (U.S. Pat. No. 5,397,386), for example, proposes to use surfactants of acetylene glycols in order to provide an ink excellent in antifoaming properties. The ink disclosed in the above reference, however, can not achieve high stability of reservation required of the ink for ink-jetting, especially stability of reservation resistant to rapid temperature change. Clogging of nozzle is liable to occur. There is also a problem of poor resistance to light of printed images.

SUMMARY OF THE INVENTION

The present invention is to provide an ink for ink-jetting excellent in stability of preservation and fungicidal properties, which can reproduce printed images excellent in water resistance.

The present invention is further to provide an ink which can reproduce printed images with little unevenness of dot-diameter at the printing time.

The present invention is still further to provide an ink for ink-jetting showing low temperature-dependency of surface tension and viscosity.

The present invention is still further to provide an ink excellent in nozzle-inside stability resistant to environmental change.

DETAILED DESCRIPTION OF THE INVENTION

The first invention relates to an ink for ink-jetting containing at least a coloring material, a water soluble organic solvent and water, comprising:

0.01–5.0% by weight of alkylene oxide adduct of acetylene glycol, represented by the formula (A):

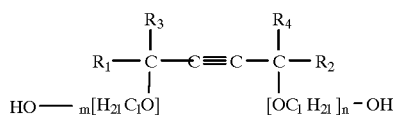

(in which $R_1$–$R_4$ are respectively an lower alkyl group; "l" is an integer of 2 or 3; and m and n are respectively an integer of 1 or more); and 2–8% by weight of polyethyleneimine, % by weight being based on total weight of the ink.

The second invention relates to an ink for ink-jetting containing at least a coloring material, a water soluble organic solvent and water, comprising:

0.01–5.0% by weight of alkylene oxide adduct of acetylene glycol, represented by the formula (A):

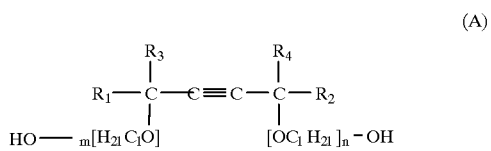

(in which $R_1$–$R_4$ are respectively an lower alkyl group; "l" is an integer of 2 or 3; and m and n are respectively an integer of 1 or more); and 0.01–2.0% by weight of alkali metal ethylenediaminetetra-acetate;

% by weight being based on total weight of the ink.

The third invention relates to an ink for ink-jetting containing at least a coloring material, a water soluble organic solvent and water, comprising:

0.01–5.0% by weight of alkylene oxide adduct of acetylene glycol, represented by the formula (A):

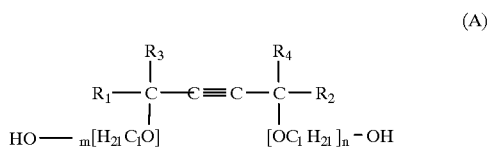

(in which $R_1$–$R_4$ are respectively an lower alkyl group; "l" is an integer of 2 or 3; and m and n are respectively an integer of 1 or more); and 0.01–2.0% by weight of a mixture of NaOH with at least one compound selected from the group consisting of $NaHCO_3$ and $Na_2B_4O_7$;

% by weight being based on total weight of the ink.

As to the coloring materials, any coloring material may be used, such as an acid dye, a direct dye, a basic dye, a reactive dye, a food color, a disperse dye, an oil soluble dye, and a pigment. Among these materials, water soluble coloring materials are preferred. A content of the coloring materials contained in the ink composition depends on a kind of coloring material, ink medium and properties required of ink. In general, the content is 0.5–10% by weight, preferably 2–6% by weight.

The ink for ink-jetting is required to control ink-blurring and stabilize ink-jetting properties from nozzle. Therefore it is necessary to adjust surface tension of ink within a specific range. Usually, a surfactant is added into ink. In the present invention, the alkylene oxide adduct of acetylene glycol represented by the formula (A) is added into ink as surfactant to adjust surface tension of ink to the range between 30 and 50 dyn/cm (25° C.). As the properties of the surfactant of the formula (A) itself depend little on temperature, the surfactant can improve stability of surface tension and viscosity of ink resistant to temperature change.

In the formula (A), $R_1$ and $R_2$ are preferably same and an C1–C5 lower alkyl group, preferably C2–C4 lower alkyl group, more preferably an isobutyl group. $R_3$ and $R_4$ are preferably same and an C1–C5 lower alkyl group, preferably a methyl group. An alkylene oxide to be added is preferably ethylene oxide, or propylene oxide. Ethylene oxide is particularly preferable. The symbol m and n may be same or different. A total of m+n is within 2–60, preferably 2–30, more preferably 6–20.

The alkylene oxide adduct of acetylene glycol of the formula (A) in which $R_1$ and $R_2$ are respectively isobutyl, $R_3$ and $R_4$ are respectively methyl and "l" is 2 is available in the market as Olfine E1004 (m+n=3.5)(made by Nisshin Kagaku Kogyo K. K.), Olfine E1010 (m+n=10) (made by Nisshin Kagaku Kogyo K. K.) and Surfynol 485 (m+n=30) (made by AIR PRODUCTS K. K.in America), being useful for ink of the present invention.

The alkylene oxide adduct of acetylene glycol of the present invention is contained in ink at an amount of 0.01–5% by weight, preferably 0.1–5% by weight, more preferably 0.1–2% by weight. If the content is less than 0.01% by weight, effects of improvement of stability can not be achieved satisfactorily by its addition. If the content is more than 5% by weight, stability of ink resistant to temperature change is deteriorated.

The first invention contains polyethyleneimine in addition to the coloring materials, water and the alkylene oxide adduct of acetylene glycol. The addition of the polyethyleneimine effects to achieve stability of preservation resistant to rapid temperature change, water resistance of printed images and high fungicidal properties. These properties could not be achieved by conventional ink.

Polyethyleneimine is a linear polymer represented by the following formula:-[$CH_2CH_2NH$]-. The polyethyleneimine may contain branches having primary amine, secondary amine and tertiary amine. Polyethyleneimine available in the market is usually a polymer of ethyleneimine having branches. A molecular weight of the polyethyleneimine is within the range between 200 and 10000, preferably 250 and 2000.

It becomes possible by the addition of polyethyleneimine to control viscosity suitable for ink-flight, ink-feeding and fixability of ink to recording medium in ink-jetting recording system without deterioration of ink-color and ink-properties. The polyethyleneimine has chelate action and antibacterial action, being different from polyethylene glycol conventionally used as thickener, to contribute to chemical and thermal stability of ink.

The polyethyleneimine is contained at an amount of 2–8% by weight, preferably 3–7% by weight, on the basis of total amount of the ink. If the content of polyethyleneimine is less than 2% by weight, the effects of the present invention cannot be obtained. If the content is more than 8% by weight, the viscosity of ink becomes so high that response to ink-flight and ink-supply properties are deteriorated and that ink-fixing rate becomes slow.

The second invention contains alkali metal salt of ethylenediaminetetraacetate in addition to the coloring materials, water and the alkylene oxide adduct of acetylene glycol. Alkali metal forming salt with ethylenediamine may be exemplified by sodium and potassium. Potassium salt is preferred. Such an alkali metal salt of ethylenediaminetetraacetate as can be used adequately in the present invention may be exemplified by disodium salt, trisodium salt, tetrasodium salt. Tetrasodium is particularly preferable. The addition of ethylenediaminetetraacetate effects to prevent clogging of shooting opening of nozzle and to improve ink stability inside ink-head under high-temperature and high humidity conditions. Ethylenediaminetetraacetate is contained at an amount of 0.01–2% by weight, preferably 0.05–1% by weight on the basis of total weight of ink. If the content is less than 0.01% by weight, addition effects can not be achieved. The content of more than 2% by weight is not preferable as ink stability is affected adversely.

The ink of the third invention contains a mixture of NaOH with at least one compound selected from the group consisting of $NaHCO_3$ and $Na_2B_4O_7$ in addition to the coloring materials, water and the alkylene oxide adduct of acetylene glycol. The mixture of NaOH with at least one compound selected from the group consisting of $NaHCO_3$ and $Na_2B_4O_7$ is contained at an amount of 0.01–2% by weight, preferably 0.05–1% by weight on the basis of total weight of ink. Weight ratio of NaOH and $NaHCO_3$etc. is 1:2–1:50, preferably 1:5–1:30. The addition of the mixture effects to achieve high improvement of stability of preservation resistant to rapid temperature change and to improve stability resistant to temperature change within practical use-temperature. These properties could not be achieved by conventional ink. Moreover clogging of nozzle can be cancelled. Unevenness of dot diameter, which has been a problem in prior arts, can be also restrained.

The water soluble organic solvent is preferably contains a compound selected from the group consisting of a polyalcohol having three hydroxyl groups, mono-, di-, and trialkylene glycols represented by the formula (B):

$$HO(C_xH_{2x}O)_yH \qquad (B)$$

(in which x and y is respectively an integer, provided that x is 2 or more and x and y have a relation of $2 \leq x \times y \leq 6$), a lower alkyl eter of the mono-, di-, and trialkylene glycols, and a mixture thereof.

The polyalcohol having three hydroxyl groups may be exemplified by glycerin.

Mono-, di-, or trialkylene glycol may be exemplified by monoalkylene glycol, such as ethylene glycol, propylene glycol, butylene glycol and hexylene glycol, dialkylene glycol, such as diethylene glycol and dipropylene glycol, and trialkylene glycol, such as triethylene glycol. When the polyalcohol is used as the water soluble organic solvent, the polyalcohol is preferably contained at an amount of 1–20% by weight, preferably 6–14% by weight on the basis of total amount of ink. When mono-, di-, or trialkylene glycol is used, it is preferably contained at an amount of 1–30% by weight, preferably 6–14% by weight on the basis of total amount of ink.

The lower alkyl ether of mono-, di-, or trialkylene glycol may be exemplified by ethylene glycol methyl ether, ethylene glycol ethyl ether, diethylene glycol methyl ether, diethylene glycol ethyl ether, diethylene glycol butyl ether, and triethylene glycol butyl ether. When the lower alkyl ether of mono-, di-, or trialkylene glycol is used, it is preferably contained at an amount of 1–30% by weight, particularly 4–10% by weight on the basis of total amount of ink.

The addition of the polyalcohol, mono-, di-, or trialkylene glycol, lower alkyl ether of mono-, di-, or trialkylene glycol and polyethyleneimine effects to improve moisture retention of ink and to stabilize viscosity and surface tension. The polyalcohol, mono-, di-, or trialkylene glycol, lower alkyl ether of mono-, di-, or trialkylene glycol and polyethyleneimine are contained so that the total amount thereof may be 10–30% by weight, preferably 13–25% by weight on the basis of total amount of ink. If the content is less than 10% by weight, the above effects can not be achieved. The addition of more than 30% by weight is not preferable because viscosity of ink becomes so high that not only ink-flight properties and ink-supplying properties are deteriorated but also ink-fixing rate is lowered.

The water-soluble organic solvent used in the second invention and the third invention preferably contain polyalkylene glycol having a molecular weight of 150 or more. The polyalkylene glycol having a molecular weight of 150 or more is exemplified by polyethylene glycol, polypropylene glycol, and copolymer of ethylene oxide and propylene oxide to be preferably used. In particular, polyethylene glycol having molecular weight of 150–600 is preferably used. The polyalkylene is contained at an amount of 2–8% by weight on the basis of total amount of ink.

The addition of the polyalcohol, mono-, di-, or trialkylene glycol, lower alkyl ether of mono-, di-, or trialkylene glycol and polyalkylene glycol effects to improve moisture retention of ink and to stabilize viscosity and surface tension. The polyalcohol, mono-, di-, or trialkylene glycol, lower alkyl ether of mono-, di-, or trialkylene glycol and polyalkylene glycol are contained so that the total amount thereof may be 10–30% by weight, preferably 13–25% by weight on the basis of total amount of ink. If the content is less than 10% by weight, the above effects can not be achieved. The addition of more than 30% by weight is not preferable because viscosity of ink becomes so high that not only ink-flight properties and ink-supplying properties are deteriorated but also ink-fixing rate is lowered.

The ink of the present invention may preferably contain aliphatic alcohol. The aliphatic alcohol may be exemplified by C1–C5 alkyl alcohol, preferably C1–C3 alkyl alcohol, such as methyl alcohol, ethyl alcohol, n-propyl alcohol and isopropyl alcohol. The aliphatic alcohol is added at an amount of 0.1–15% by weight, preferably 1–6% by weight on the basis of total weight of ink. The addition of aliphatic alcohol effects to improve drying characteristics and fixability of ink. These effects can not be obtained if the addition is low. If the addition is more than 15% by weight, there may often arise a problem, such as clogging of nozzle.

The ink of the present invention may preferably contain an amphiphilic agent. The amphiphilic agent may exemplified by urea, amide, cyclic amide, and alkanol amine. Particularly, alkanol amine, for example, triethanolamine is preferable. The amphiphilic agent is added at an amount of 0.01–5 by weight, preferably 0.1–2% by weight on the basis of total weight of ink. The addition of amphiphilic agent effects to prevent crystals from depositing with time, resulting in improvement of ink stability. These effects can not be obtained if the addition is less than 0.01% by weight. If the addition is more than 5% by weight, blur becomes conspicuous.

The ink of the present invention may contain any conventional additive other than the above, if necessary. Such an additive may be exemplified by an antifungal agent, an antiseptic agent, a pH modifier, an chelating agent, an oxygen-absorbent, a corrosion inhibitor and a quencher.

The ink of the present invention contains water at an amount of 60–90% by weight, preferably 70–90% by weight.

The ink of the present invention may be applied to any printer in so far as the printer adopts an ink-jet recording system. As the ink of the present invention has very low dependency of viscosity and surface tension on temperature, the ink of the present invention may be preferable applicable to an ink-jet recording machine adopting piezosystem in which flight voltage is varied to change ink diameter of shot ink for reproduction of gradation.

The present invention is further explained by Examples. It is of course not the intention hereby to limit the invention.

EXAMPLE

The ingredients shown below in each Example and Comparative Example were mixed and sufficiently stirred to be dissolved. The resultant mixture were filtered. The filtered mixture was left to stand for 1 hour under vacuum conditions to be degassed. Thus, ink was prepared. Olfine E1010 (made by Nisshin Kagaku Kogyo K. K.) used in the examples below is the compound shown by the formula (A) in which $R_1$ and $R_2$ are respectively isobutyl, $R_3$ and $R_4$ are respectively methyl, "l" is 2 and m+n=10.

Example 1

| Composition | Content (% by weight) |
|---|---|
| Water | 78.4 |
| Diethylene glycol | 10.0 |
| Polyethyleneimine (Epomine SP-006) (molecular weight: 600, made by Nippon Syokubai K.K.) | 4.5 |
| C.I.27755 (black dye) | 4.6 |
| Olfine-E1010 (made by Nisshin Kagaku Kogyo K.K.) | 0.8 |
| $N(CH_2CH_2OH)_3$ | 0.2 |
| $NaHCO_3/NaOH$ (19:1) | 0.2 |
| Tetrasodium ethylenediaminetetraacetate | 0.2 |
| 1,2-benzisothiazoline-3-on (fungicide) | 0.1 |
| Ethyl alcohol/isopropyl alcohol (1:1) | 1.0 |

Example 2

| Composition | Content (% by weight) |
|---|---|
| Water | 80.7 |
| Triethylene glycol butyl ether | 6.5 |
| Polyethyleneimine (Epomine SP-006) | 7.6 |
| C.I.27755 (black dye) | 4.3 |
| Olfine-E1004 (made by Nisshin Kagaku Kogyo K.K.) | 0.1 |
| $N(CH_2CH_2OH)_3$ | 0.2 |
| $NaHCO_3/NaOH$ (19:1) | 0.2 |
| Tetrasodium ethylenediaminetetraacetate | 0.3 |
| 1,2-benzisothiazoline-3-on | 0.1 |

Example 3

| Composition | Content (% by weight) |
|---|---|
| Water | 72.8 |
| Diethylene glycol | 12.2 |
| Polyethyleneimine (Epomine SP-006) | 2.0 |
| C.I.27755 (black dye) | 5.5 |
| Olfine-E1010 (made by Nisshin Kagaku Kogyo K.K.) | 4.5 |
| $N(CH_2CH_2OH)_3$ | 0.9 |
| $Na_2B_4O_7/NaOH$ (19:1) | 0.2 |
| Tetrasodium ethylenediaminetetraacetate | 1.8 |
| 1,2-benzisothiazoline-3-on | 0.1 |

Example 4

| Composition | Content (% by weight) |
|---|---|
| Water | 73.8 |
| Diethylene glycol | 7.0 |
| Triethylene glycol butyl ether | 7.0 |
| Polyethyleneimine (Epomine SP-006) | 4.5 |
| C.I.19140 (yellow dye) | 2.6 |
| Olfine-E1010 (made by Nisshin Kagaku Kogyo K.K.) | 2.8 |
| $N(CH_2CH_2OH)_3$ | 1.8 |
| $NaHCO_3/NaOH$ (19:1) | 0.2 |
| Tetrasodium ethylenediaminetetraacetate | 0.2 |
| 1,2-benzisothiazoline-3-on | 0.1 |

Example 5

| Composition | Content (% by weight) |
|---|---|
| Water | 83.0 |
| Diethylene glycol | 6.2 |
| Polyethyleneimine (Epomine SP-006) | 4.3 |
| C.I.45100 (magenta dye) | 2.5 |
| Olfine-E1010 (made by Nisshin Kagaku Kogyo K.K.) | 1.2 |
| $N(CH_2CH_2OH)_3$ | 0.2 |
| $NaHCO_3$/NaOH (19:1) | 0.2 |
| Tetrasodium ethylenediaminetetraacetate | 0.5 |
| 1,2-benzisothiazoline-3-on | 0.1 |
| Ethanol/isopropyl alcohol (1:1) | 1.8 |

Example 6

| Composition | Content (% by weight) |
|---|---|
| Water | 84.8 |
| Triethylene glycol butyl ether | 6.5 |
| Polyethyleneimine (Epomine SP-006) | 4.2 |
| C.I.74180 (cyan dye) | 3.0 |
| Olfine-E1010 (made by Nisshin Kagaku Kogyo K.K.) | 0.8 |
| $N(CH_2CH_2OH)_3$ | 0.2 |
| $Na_2B_4O_7$/NaOH (19:1) | 0.2 |
| Tetrasodium ethylenediaminetetraacetate | 0.2 |
| 1,2-benzisothiazoline-3-on | 0.1 |

Example 7

| Composition | Content (% by weight) |
|---|---|
| Water | 78.7 |
| Diethylene glycol | 10.0 |
| Polyethyleneimine (Epomine SP-006) | 4.5 |
| C.I.27755 (black dye) | 4.5 |
| Olfine-E1010 (made by Nisshin Kagaku Kogyo K.K.) | 0.8 |
| $N(CH_2CH_2OH)_3$ | 0.2 |
| $Ca(OH)_2$/NaOH (19:1) | 0.2 |
| 1,2-benzisothiazoline-3-on | 0.1 |
| Ethyl alcohol | 1.0 |

Example 8

| Composition | Content (% by weight) |
|---|---|
| Water | 78.8 |
| Glycerin | 10.0 |
| Polyethyleneimine (Epomine SP-006) | 4.5 |
| C.I.27755 (black dye) | 4.5 |
| Olfine-E1010 (made by Nisshin Kagaku Kogyo K.K.) | 0.8 |
| $N(CH_2CH_2OH)_3$ | 0.2 |
| $Ca(OH)_2$/NaOH (19:1) | 0.2 |
| Ethyl alcohol | 1.0 |

Example 9

| Composition | Content (% by weight) |
|---|---|
| Water | 72.0 |
| Diethylene glycol | 10.0 |
| Triethylene glycol butyl ether | 7.0 |
| Polyethyleneimine (Epomine SP-012) (molecular weight: approximately 1200, made by Nippon Syokubai K.K.) | 4.0 |
| Water soluble dye C.I.45100 (red dye) | 2.5 |
| Surfactant "Olfine-E1010" (made by Nisshin Kagaku Kogyo K.K.) | 0.8 |
| Triethanolamine | 0.2 |
| $Na_2B_4O_7$/NaOH (19:1) | 0.2 |
| Tetrasodium ethylenediaminetetraacetate | 1.7 |
| 1,2-benzisothiazoline-3-on | 0.1 |
| Ethanol | 1.5 |

Comparative Example 1

| Composition | Content (% by weight) |
|---|---|
| Water | 79.5 |
| Diethylene glycol | 10.0 |
| Polyethyleneimine (Epomine SP-006) | 4.5 |
| C.I.27755 (black dye) | 4.5 |
| $N(CH_2CH_2OH)_3$ | 0.2 |
| $Ca(OH)_2$/NaOH (19:1) | 0.2 |
| 1,2-benzisothiazoline-3-on | 0.1 |
| Ethyl alcohol | 1.0 |

Comparative Example 2

| Composition | Content (% by weight) |
|---|---|
| Water | 74.0 |
| Diethylene glycol | 10.0 |
| Polyethyleneimine (M.W.: 600) | 4.5 |
| C.I.27755 (black dye) | 4.5 |
| Olfine-E1010 (made by Nisshin Kagaku Kogyo K.K.) | 5.5 |
| $N(CH_2CH_2OH)_3$ | 0.2 |
| $Ca(OH)_2$/NaOH (19:1) | 0.2 |
| 1,2-benzisothiazoline-3-on | 0.1 |
| Ethyl alcohol | 1.0 |

Comparative Example 3

| Composition | Content (% by weight) |
|---|---|
| Water | 84.2 |
| Diethylene glycol | 10.0 |
| C.I.27755 (black dye) | 4.5 |
| Olfine-E1010 (made by Nisshin Kagaku Kogyo K.K.) | 0.8 |
| $N(CH_2CH_2OH)_3$ | 0.2 |
| $Ca(OH)_2$/NaOH (19:1) | 0.2 |
| 1,2-benzisothiazoline-3-on | 0.1 |
| Ethyl alcohol | 1.0 |

Comparative Example 4

| Composition | Content (% by weight) |
|---|---|
| Water | 74.7 |
| Diethylene glycol | 10.0 |
| Polyethyleneimine (Epomine SP-006) | 8.5 |
| C.I.27755 (black dye) | 4.5 |
| Olfine-E1010 (made by Nisshin Kagaku Kogyo K.K.) | 0.8 |
| $N(CH_2CH_2OH)_3$ | 0.2 |

-continued

| Composition | Content (% by weight) |
|---|---|
| Ca(OH)$_2$/NaOH (19:1) | 0.2 |
| 1,2-benzisothiazoline-3-on | 0.1 |
| Ethyl alcohol | 1.0 |

Comparative Example 5

| Composition | Content (% by weight) |
|---|---|
| Water | 83.3 |
| Diethylene glycol | 10.0 |
| C.I.27755 (black dye) | 4.5 |
| Olfine-E1010 (made by Nisshin Kagaku Kogyo K.K.) | 0.8 |
| N(CH$_2$CH$_2$OH)$_3$ | 0.2 |
| Ca(OH)$_2$/NaOH (19:1) | 0.2 |
| Ethyl alcohol | 1.0 |

The inks obtained in Examples 1–9 and Comparative Examples 1–5 were studied with respect to surface tension, viscosity and pH at 25° C., keeping quality resistant to thermal shock and temperature dependency of surface tension and viscosity. Fungicidal properties of ink and water resistance of printed images were also studied. The measuring method was as follows.

1) Keeping Quality Resistant to Thermal Shock

Ink preserved in a bottle made of polyethylene at 25° C. was left to stand at –20° C. and 50° C. respectively for 1 hour. This thermal shock was repeated three times a day for 1 week. The rate of change was ranked as follows:

○: The rate of change was 5% or less.

Δ: The rate of change was 10% or less (no problem on practical use).

x: The rate of change was more than 10% (no practical use).

2) Temperature Dependency

Rate of change of ink was studied between 10° C. and 35° C. regarding surface tension and viscosity. The rate of change was ranked in a way similar to the above item 1).

3) Water resistance

Ink jet printer (MJ-500; made by Epson K. K.) was used. Ink cartridge for the printer was filled with the inks of Examples and Comparative Examples. Images were printed on SF paper made by Epson K. K.to evaluate water resistance. Mono-color solid images having 5'5 mm$^2$ area were reproduced and printed images were dried naturally for 24 hours. Density of printed images were measured by Sakura Densitometer PDA65. Then, the paper were immersed in pure water for 10 minutes. The paper was taken out of water and dried naturally. Color density was measured. The difference of density before and after immersion was ranked in a manner similar to the above item 1).

4) Fungicidal test

Evaluation was made as follows by use of bacteria designated in JIS Z 2911 (mold-resistant test method).

a) Bacterial strain for test

*Aspergillus niger* IFO 4407

*Chaelomium globosum* IFO 6347

*Cladsporium cladosporioides* IFO 6348

*Penicillium citrinum* IFO 7784

*Rhizopus siolonifer* IFO 5411 b) Preparation of cystoid spore suspension

Each bacterial strain for test was cultured on potato dextrose agar (made by Eiken Kagaku K. K.) at 25° C. for 10 days. Then cystoid spore(conidiospore) was suspended in sterilized 0.005% dioctyl sodium sulfosuccinate to give suspension of monocystoid spore.

Equivalent weight of each suspension of monocystoid spore was taken to be mixed to give suspension of mixed cystoid spore.

c) Test operation

Each ink of 2 ml was put into plastic dish. Two milliliter of the suspension of mixed cystoid spore was seeded. The dish was capped and preserved under conditions of 28±2° C. and approximately 97% humidity. After 4-week culture, developmental conditions of fungal thread in the specimen were observed visually and by microscope.

○: No development of fungi.

Δ: Area of fungi development was less than ⅓ of all area. This is the result equivalent to no change in cartridge for 2 years. No practical problem.

x: Area of fungi development was more than ⅓ of all area. No practical use.

The evaluation of "Δ" of no practical problem was made by binary printing performed in Examples. Therefore even when the evaluation of "Δ" was given, there may arise practical inconvenience when dot diameter is made small or when gradation printing is made with dot diameter variable.

The results obtained above are shown in Table 1 below:

TABLE 1

|  | Ex. 1 | Ex. 2 | Ex. 3 | Ex. 4 | Ex. 5 | Ex. 6 | Ex. 7 | Ex. 8 | Ex. 9 | Comp. Ex. 1 | Comp. Ex. 2 | Comp. Ex. 3 | Comp. Ex. 4 | Comp. Ex. 5 |
|---|---|---|---|---|---|---|---|---|---|---|---|---|---|---|
| Surface tension (dyne/cm) 25° C. | 36.5 | 45.6 | 28.8 | 31.0 | 38.3 | 37.5 | 38.3 | 38.8 | 29.8 | 40.2 | 32.5 | 42.3 | 35.6 | 45.0 |
| Viscosity(cp) 25° C. | 2.2 | 3.7 | 4.6 | 4.2 | 1.9 | 1.8 | 2.0 | 1.8 | 2.6 | 1.7 | 2.8 | 1.7 | 2.6 | 1.6 |
| pH 25° C. | 8.0 | 8.9 | 9.5 | 9.2 | 7.5 | 7.5 | 7.8 | 7.8 | 8.3 | 7.5 | 8.2 | 7.5 | 8.0 | 7.3 |
| Keeping quality | ○ | ○ | ○ | ○ | ○ | ○ | Δ | Δ | ○ | x | x | x | x | x |
| Water resistance | ○ | ○ | Δ | ○ | ○ | ○ | ○ | ○ | ○ | ○ | ○ | x | ○ | x |
| Temperature dependency |  |  |  |  |  |  |  |  |  |  |  |  |  |  |
| Surface tension | ○ | ○ | ○ | ○ | ○ | ○ | ○ | ○ | ○ | x | ○ | ○ | ○ | ○ |
| Viscosity | ○ | ○ | ○ | ○ | ○ | ○ | ○ | ○ | ○ | x | Δ | ○ | ○ | ○ |
| Fungicidal test | ○ | ○ | ○ | ○ | ○ | ○ | ○ | Δ | ○ | ○ | ○ | Δ | ○ | x |

Example 10

| Composition | Content (% by weight) |
|---|---|
| Water | 80.8 |
| Diethylene glycol | 7.0 |
| Polyethylene glycol (#400, molecular weight: 400) | 4.3 |
| C.I.27755 (black dye) | 4.5 |
| Olfine-E1010 (made by Nisshin Kagaku Kogyo K.K.) | 0.7 |
| N(CH$_2$CH$_2$OH)$_3$ | 0.2 |
| NaHCO$_3$/NaOH (19:1) | 0.2 |
| Tetrasodium ethylenediaminetetraacetate | 0.2 |
| 1,2-benzisothiazoline-3-on (fungicide) | 0.1 |
| Ethyl alcohol | 2.0 |

Example 11

| Composition | Content (% by weight) |
|---|---|
| Water | 84.05 |
| Triethylene glycol butyl ether | 6.5 |
| Polyethylene glycol (#300, molecular weight: 300) | 4.5 |
| C.I.27755 (black dye) | 4.3 |
| Olfine-E1004 (made by Nisshin Kagaku Kogyo K.K.) | 0.1 |
| N(CH$_2$CH$_2$OH)$_3$ | 0.2 |
| NaHCO$_3$/NaOH (19:1) | 0.2 |
| Tetrasodium ethylenediaminetetraacetate | 0.05 |
| 1,2-benzisothiazoline-3-on | 0.1 |

Example 12

| Composition | Content (% by weight) |
|---|---|
| Water | 70.8 |
| Diethylene glycol | 12.2 |
| Polyethylene glycol (#400) | 4.0 |
| C.I.27755 (black dye) | 5.5 |
| Olfine-E1010 (made by Nisshin Kagaku Kogyo K.K.) | 4.5 |
| N(CH$_2$CH$_2$OH)$_3$ | 0.9 |
| Na$_2$B$_4$O$_7$/NaOH (19:1) | 0.2 |
| Tetrasodium ethylenediaminetetraacetate | 1.8 |
| 1,2-benzisothiazoline-3-on | 0.1 |

Example 13

| Composition | Content (% by weight) |
|---|---|
| Water | 66.8 |
| Diethylene glycol | 14.0 |
| Triethylene glycol butyl ether | 7.0 |
| Polyethylene glycol (#400) | 4.5 |
| C.I.19140 (yellow dye) | 2.6 |
| Olfine-E1010 (made by Nisshin Kagaku Kogyo K.K.) | 2.8 |
| N(CH$_2$CH$_2$OH)$_3$ | 1.8 |
| NaHCO$_3$/NaOH (19:1) | 0.2 |
| Tetrasodium ethylenediaminetetraacetate | 0.2 |
| 1,2-benzisothiazoline-3-on | 0.1 |

Example 14

| Composition | Content (% by weight) |
|---|---|
| Water | 82.0 |
| Diethylene glycol | 6.2 |
| Polyethylene glycol (#300) | 4.3 |
| C.I.45100 (magenta dye) | 2.5 |
| Olfine-E1004 (made by Nisshin Kagaku Kogyo K.K.) | 1.2 |
| N(CH$_2$CH$_2$OH)$_3$ | 2.2 |
| NaHCO$_3$/NaOH (19:1) | 0.2 |
| Tetrasodium ethylenediaminetetraacetate | 0.5 |
| 1,2-benzisothiazoline-3-on | 0.1 |
| Isopropyl alcohol | 0.8 |

Example 15

| Composition | Content (% by weight) |
|---|---|
| Water | 84.8 |
| Triethylene glycol butyl ether | 6.5 |
| Polyethylene glycol (#200) | 4.2 |
| C.I.74180 (cyan dye) | 3.0 |
| Olfine-E1010 (made by Nisshin Kagaku Kogyo K.K.) | 0.8 |
| N(CH$_2$CH$_2$OH)$_3$ | 0.2 |
| Na$_2$B$_4$O$_7$/NaOH (19:1) | 0.2 |
| Tetrasodium ethylenediaminetetraacetate | 0.2 |
| 1,2-benzisothiazoline-3-on | 0.1 |

Example 16

| Composition | Content (% by weight) |
|---|---|
| Water | 80.5 |
| Diethylene glycol | 7.0 |
| Polyethylene glycol (#400) | 4.5 |
| C.I.27755 (black dye) | 4.5 |
| Olfine-E1010 (made by Nisshin Kagaku Kogyo K.K.) | 0.8 |
| N(CH$_2$CH$_2$OH)$_3$ | 0.2 |
| Ca(OH)$_2$/NaOH (19:1) | 0.2 |
| Tetrasodium ethylenediaminetetraacetate | 0.2 |
| 1,2-benzisothiazoline-3-on | 0.1 |
| Ethyl alcohol | 2.0 |

Comparative Example 6

| Composition | Content (% by weight) |
|---|---|
| Water | 80.7 |
| Diethylene glycol | 7.0 |
| Polyethylene glycol (#400) | 4.5 |
| C.I.27755 (black dye) | 4.5 |
| Olfine-E1010 (made by Nisshin Kagaku Kogyo K.K.) | 0.8 |
| N(CH$_2$CH$_2$OH)$_3$ | 0.2 |
| Ca(OH)$_2$/NaOH (19:1) | 0.2 |
| 1,2-benzisothiazoline-3-on | 0.1 |
| Ethyl alcohol | 2.0 |

Comparative Example 7

| Composition | Content (% by weight) |
|---|---|
| Water | 78.5 |
| Diethylene glycol | 7.0 |
| Polyethylene glycol (#400) | 4.5 |
| C.I.27755 (black dye) | 4.5 |
| Olfine-E1010 (made by Nisshin Kagaku Kogyo K.K.) | 0.8 |
| N(CH$_2$CH$_2$OH)$_3$ | 0.2 |
| Ca(OH)$_2$/NaOH (19:1) | 0.2 |

-continued

| Composition | Content (% by weight) |
|---|---|
| Tetrasodium ethylenediaminetetraacetate | 2.2 |
| 1,2-benzisothiazoline-3-on | 0.1 |
| Ethyl alcohol | 2.0 |

Comparative Example 8

| Composition | Content (% by weight) |
|---|---|
| Water | 81.5 |
| Diethylene glycol | 7.0 |
| Polyethylene glycol (#400) | 4.5 |
| C.I.27755 (black dye) | 4.5 |
| N(CH$_2$CH$_2$OH)$_3$ | 0.2 |
| Ca(OH)$_2$/NaOH (19:1) | 0.2 |
| 1,2-benzisothiazoline-3-on | 0.1 |
| Ethyl alcohol | 2.0 |

Comparative Example 9

| Composition | Content (% by weight) |
|---|---|
| Water | 76.0 |
| Diethylene glycol | 7.0 |
| Polyethylene glycol (#400) | 4.5 |
| C.I.27755 (black dye) | 4.5 |
| Olfine-E1010 (made by Nisshin Kagaku Kogyo K.K.) | 5.5 |
| N(CH$_2$CH$_2$OH)$_3$ | 0.2 |
| Ca(OH)$_2$/NaOH (19:1) | 0.2 |
| 1,2-benzisothiazoline-3-on | 0.1 |
| Ethyl alcohol | 2.0 |

The inks obtained in Examples 10–16 and Comparative Examples 6–9 were studied with respect to surface tension, viscosity and pH at 25° C., keeping quality resistant to thermal shock and temperature dependency of surface tension and viscosity in a way similar to Example 1. When printing was made by a practical machine with the obtained inks loaded therein, environmental keeping quality and nozzle clogging were evaluated. The measuring method is as follows.

1) Test in practical machine

An ink-jet printer (M-500; made by Epson K. K.) was used.

Environmental Keeping Quality Test

The printer was filled with ink. Before and after the printer was left to stand in environmental test room under conditions of 35° C. and 20% RH for 100 hours, contaminants around the nozzle were observed. It was examined whether the contaminants were removed by usual maintenance methods, such as wiping, purging and cap suction. Evaluation was made as follows.

◯: No change.

Δ: Contaminants were deposited around the nozzle, but the contaminants could be removed by the maintenance working.

x: Contaminants were adhered around the nozzle after maintenance working.

Nozzle Clogging Test:

Color chart (test chart having 20% of coating rate (size:A4)) of the same color as ink was reproduced on 100 sheets of SF paper (made by Epson K. K) under high temperature and high humidity conditions (35° C., 85% RH).

Nozzle clogging was observed by microscope after printing. The nozzle with contaminants adhered therearound was cleaned by rubber blade equipped in MJ-500 for cleaning. Evaluation was made as follows:

◯: no contaminant was adhered around nozzle. Ink showed good utility.

Δ: Some contaminants were observed around nozzle, but the contaminants could be removed by cleaning. Printing properties have no practical problem. N x: Contaminants were adhered around nozzle. Dots became thin and defective. Some nozzles could not be recovered by cleaning. No utility.

The evaluation of "Δ" of no practical problem was made by binary printing performed in Examples. Therefore even when the evaluation of "Δ" was given, there may arise practical inconvenience when dot diameter is made small or when gradation printing is made with dot diameter variable.

The results are shown in Table 2.

TABLE 2

|  | Ex. 10 | Ex. 11 | Ex. 12 | Ex. 13 | Ex. 14 | Ex. 15 | Ex. 16 | Comp. Ex. 6 | Comp. Ex. 7 | Comp. Ex. 8 | Comp. Ex. 9 |
|---|---|---|---|---|---|---|---|---|---|---|---|
| Surface tension (dyne/cm) 25° C. | 38.0 | 35.6 | 29.8 | 30.8 | 33.3 | 45.5 | 38.7 | 38.2 | 33.0 | 39.4 | 32.2 |
| Viscosity(cp) 25° C. | 1.7 | 1.6 | 3.7 | 4.2 | 2.1 | 1.4 | 1.8 | 1.9 | 2.2 | 1.8 | 2.7 |
| pH 25° C. | 7.6 | 7.5 | 8.9 | 9.2 | 9.0 | 7.4 | 7.6 | 7.8 | 8.5 | 7.9 | 8.5 |
| Keeping quality | ◯ | ◯ | ◯ | ◯ | ◯ | ◯ | ◯ | x | x | x | x |
| Environmental keeping-quality test | ◯ | ◯ | ◯ | ◯ | ◯ | ◯ | Δ | x | x | x | x |
| Nozzle clogging test | ◯ | ◯ | ◯ | ◯ | ◯ | ◯ | ◯ | x | Δ | x | Δ |
| Temperature dependency |  |  |  |  |  |  |  |  |  |  |  |
| Surface tension | ◯ | ◯ | ◯ | ◯ | ◯ | ◯ | ◯ | ◯ | ◯ | x | ◯ |
| Viscosity | ◯ | ◯ | ◯ | ◯ | ◯ | ◯ | ◯ | ◯ | ◯ | x |  |

Example 17

| Composition | Content (% by weight) |
|---|---|
| Water | 80.8 |
| Diethylene glycol | 7.0 |
| Polyethylene glycol (#400) | 4.3 |
| C.I.27755 (black dye) | 4.5 |
| Olfine-E1010 (made by Nisshin Kagaku Kogyo K.K.) | 0.7 |
| N(CH$_2$CH$_2$OH)$_3$ | 0.2 |
| NaHCO$_3$/NaOH (19:1) | 0.2 |

-continued

| Composition | Content (% by weight) |
|---|---|
| Tetrasodium ethylenediaminetetraacetate | 0.2 |
| 1,2-benzisothiazoline-3-on (fungicide) | 0.1 |
| Ethyl alcohol | 2.0 |

Example 18

| Composition | Content (% by weight) |
|---|---|
| Water | 83.9 |
| Triethylene glycol butyl ether | 6.5 |
| Polyethylene glycol (#300) | 4.5 |
| C.I.27755 (black dye) | 4.3 |
| Olfine-E1010 (made by Nisshin Kagaku Kogyo K.K.) | 0.1 |
| $N(CH_2CH_2OH)_3$ | 0.2 |
| $NaHCO_3/NaOH$ (19:1) | 0.2 |
| Tetrasodium ethylenediaminetetraacetate | 0.2 |
| 1,2-benzisothiazoline-3-on | 0.1 |

Example 19

| Composition | Content (% by weight) |
|---|---|
| Water | 71.0 |
| Diethylene glycol | 12.2 |
| Polyethylene glycol (#400) | 4.0 |
| C.I.27755 (black dye) | 5.5 |
| Olfine-E1010 (made by Nisshin Kagaku Kogyo K.K.) | 4.5 |
| $N(CH_2CH_2OH)_3$ | 0.9 |
| $Na_2B_4O_7/NaOH$ (19:1) | 0.6 |
| Tetrasodium ethylenediaminetetraacetate | 1.2 |
| 1,2-benzisothiazoline-3-on | 0.1 |

Example 20

| Composition | Content (% by weight) |
|---|---|
| Water | 65.1 |
| Diethylene glycol | 14.0 |
| Triethylene glycol butyl ether | 7.0 |
| Polyethylene glycol (#400) | 4.5 |
| C.I.19140 (yellow dye) | 2.6 |
| Olfine-E1010 (made by Nisshin Kagaku Kogyo K.K.) | 2.8 |
| $N(CH_2CH_2OH)_3$ | 1.8 |
| $NaHCO_3/NaOH$ (19:1) | 0.8 |
| Tetrasodium ethylenediaminetetraacetate | 1.3 |
| 1,2-benzisothiazoline-3-on | 0.1 |

Example 21

| Composition | Content (% by weight) |
|---|---|
| Water | 80.8 |
| Diethylene glycol | 6.2 |
| Polyethylene glycol (#300) | 4.3 |
| C.I.45100 (magenta dye) | 2.5 |
| Olfine-E1010 (made by Nisshin Kagaku Kogyo K.K.) | 1.2 |
| $N(CH_2CH_2OH)_3$ | 2.2 |
| $NaHCO_3/NaOH$ (19:1) | 0.4 |
| Tetrasodium ethylenediaminetetraacetate | 1.5 |
| 1,2-benzisothiazoline-3-on | 0.1 |
| Isopropyl alcohol | 0.8 |

Example 15

| Composition | Content (% by weight) |
|---|---|
| Water | 84.8 |
| Triethylene glycol butyl ether | 6.5 |
| Polyethylene glycol (#200) | 4.2 |
| C.I.74180 (cyan dye) | 3.0 |
| Olfine-E1010 (made by Nisshin Kagaku Kogyo K.K.) | 0.8 |
| $N(CH_2CH_2OH)_3$ | 0.2 |
| $Na_2B_4O_7/NaOH$ (19:1) | 0.2 |
| Tetrasodium ethylenediaminetetraacetate | 0.2 |
| 1,2-benzisothiazoline-3-on | 0.1 |

Example 23

| Composition | Content (% by weight) |
|---|---|
| Water | 80.5 |
| Diethylene glycol | 7.0 |
| Polyethylene glycol (#400) | 4.5 |
| C.I.27755 (black dye) | 4.5 |
| Olfine-E1010 (made by Nisshin Kagaku Kogyo K.K.) | 0.8 |
| $N(CH_2CH_2OH)_3$ | 0.2 |
| $NaHCO_3/NaOH$ (19:1) | 0.2 |
| Sodium gluconate | 0.2 |
| 1,2-benzisothiazoline-3-on | 0.1 |
| Ethyl alcohol | 2.0 |

Comparative Example 10

| Composition | Content (% by weight) |
|---|---|
| Water | 81.3 |
| Diethylene glycol | 7.0 |
| Polyethylene glycol (#400) | 4.5 |
| C.I.27755 (black dye) | 4.5 |
| $N(CH_2CH_2OH)_3$ | 0.2 |
| $NaHCO_3/NaOH$ (19:1) | 0.2 |
| Sodium gluconate | 0.2 |
| 1,2-benzisothiazoline-3-on | 0.1 |
| Ethyl alcohol | 2.0 |

Comparative Example 11

| Composition | Content (% by weight) |
|---|---|
| Water | 75.8 |
| Diethylene glycol | 7.0 |
| Polyethylene glycol (#400) | 4.5 |
| C.I.27755 (black dye) | 4.5 |
| Olfine-E1010 (made by Nisshin Kagaku Kogyo K.K.) | 5.5 |
| $N(CH_2CH_2OH)_3$ | 0.2 |
| $NaHCO_3/NaOH$ (19:1) | 0.2 |
| Sodium gluconate | 0.2 |
| 1,2-benzisothiazoline-3-on | 0.1 |
| Ethyl alcohol | 2.0 |

Comparative Example 12

| Composition | Content (% by weight) |
|---|---|
| Water | 80.5 |
| Diethylene glycol | 7.0 |
| Polyethylene glycol (#400) | 4.5 |

-continued

| Composition | Content (% by weight) |
|---|---|
| C.I.27755 (black dye) | 4.5 |
| Polyether-modified silicone oil TSF4452 (made by Toshiba silicone K.K.) | 0.8 |
| N(CH₂CH₂OH)₃ | 0.2 |
| NaHCO₃/NaOH (19:1) | 0.2 |
| Sodium gluconate | 0.2 |
| 1,2-benzisothiazoline-3-on | 0.1 |
| Ethyl alcohol | 2.0 |

Comparative Example 13

| Composition | Content (% by weight) |
|---|---|
| Water | 80.7 |
| Diethylene glycol | 7.0 |
| Polyethylene glycol (#400) | 4.5 |
| C.I.27755 (black dye) | 4.5 |
| Olfine-E1010 (made by Nisshin Kagaku Kogyo K.K.) | 0.8 |
| N(CH₂CH₂OH)₃ | 0.2 |
| Sodium gluconate | 0.2 |
| 1,2-benzisothiazoline-3-on | 0.1 |
| Ethyl alcohol | 2.0 |

Comparative Example 14

| Composition | Content (% by weight) |
|---|---|
| Water | 77.7 |
| Diethylene glycol | 7.0 |
| Polyethylene glycol (#400) | 4.5 |
| C.I.27755 (black dye) | 4.5 |
| Olfine-E1010 (made by Nisshin Kagaku Kogyo K.K.) | 0.8 |
| N(CH₂CH₂OH)₃ | 0.2 |
| NaHCO₃/NaOH (19:1) | 3.0 |
| Sodium gluconate | 0.2 |
| 1,2-benzisothiazoline-3-on | 0.1 |
| Ethyl alcohol | 2.0 |

The inks obtained in Examples 17–23 and Comparative Examples 10–14 were studied with respect to surface tension, viscosity and pH at 25° C., keeping quality resistant to thermal shock and temperature dependency of surface tension and viscosity in a manner similar to Example 1. When printing was made by a practical machine with the obtained inks loaded therein, nozzle clogging was evaluated in a manner similar to Example 10. When printing was made by a practical machine with the obtained inks loaded therein, unevenness of dot diameter was measured. The measuring method is as follows.

1) Test in practical machine

An ink-jet printer (MJ-500; made by Epson K. K.) was used.

Unevenness of Dot Diameter

The printer was filled with ink. One hundred dot-printing was made to measure unevenness of dot diameter. The measurement was made by use of SF paper made by Epson K. K.under conditions of 25° C. and 65% RH.

The evaluation of "Δ" of no practical problem was made by binary printing performed in Examples. Therefore even when the evaluation of "Δ" was given, there may arise practical inconvenience when dot diameter is made small or when gradation printing is made with dot diameter variable.

The results are shown in Table 3.

TABLE 3

| | Ex. 17 | Ex. 18 | Ex. 19 | Ex. 20 | Ex. 21 | Ex. 22 | Ex. 23 | Comp. Ex. 10 | Comp. Ex. 11 | Comp. Ex. 12 | Comp. Ex. 13 | Comp. Ex. 14 |
|---|---|---|---|---|---|---|---|---|---|---|---|---|
| Surface tension (dyne/cm) 25° C. | 38.0 | 35.4 | 29.5 | 30.4 | 33.0 | 39.5 | 41.3 | 42.3 | 35.1 | 39.1 | 39.5 | 36.2 |
| Viscosity(cp) 25° C. | 1.7 | 1.5 | 3.4 | 4.6 | 2.0 | 1.4 | 1.8 | 1.7 | 2.4 | 1.9 | 1.8 | 2.4 |
| pH 25° C. | 7.8 | 7.6 | 8.5 | 9.1 | 8.0 | 7.5 | 7.7 | 7.6 | 8.3 | 7.8 | 7.6 | 10.8 |
| Keeping quality | ○ | ○ | ○ | ○ | ○ | ○ | ○ | x | ○ | ○ | x | Δ |
| Nozzle clogging test | ○ | ○ | ○ | ○ | ○ | ○ | x | x | Δ | x | x | x |
| Unevenness of dot diameter (μm) | ±3.0 | ±2.6 | ±2.5 | ±2.8 | ±2.2 | ±2.5 | ±4.8 | ±5.2 | ±7.5 | ±4.5 | ±6.3 | ±5.6 |
| | ○ | ○ | ○ | ○ | ○ | ○ | Δ | x | x | Δ | x | x |
| Mean diameter of dot (μm) | 105.6 | 103.2 | 97.6 | 91.4 | 100.6 | 103.0 | 110.4 | 108.4 | 115.4 | 101.4 | 102.0 | 105.4 |
| Temperature dependency | | | | | | | | | | | | |
| Surface tension | ○ | ○ | ○ | ○ | ○ | ○ | ○ | x | ○ | x | Δ | Δ |
| Viscosity | ○ | ○ | ○ | ○ | ○ | ○ | ○ | x | Δ | x | ○ | ○ |

What is claimed is:

1. An ink for ink-jetting, comprising:
   0.5–10% by weight of a coloring material,
   0.01–5.0% by weight of alkylene oxide adduct of acetylene glycol, represented by the formula (A):

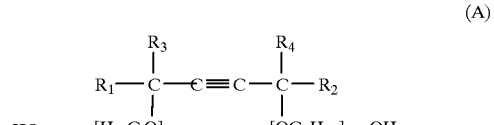

(in which $R_1$–$R_4$ are respectively an lower alkyl group; "l" is an integer of 2 or 3; and m and n are respectively an integer of 1 or more);

2-8% by weight of polyethyleneimine; and water,

% by weight being based on total weight of the ink.

2. An ink of claim 1, in which polyethyleneimine has a molecular weight of 200–10000.

3. An ink of claim 1, further comprising 1–20% by weight of a polyalcohol having three hydroxyl groups based on total weight of the ink.

4. An ink of claim 1, further comprising 1–30% by weight of a lower alkyl ether of alkylene glycol, based on total weight of the ink.

5. An ink of claim 1, further comprising 1–30% by weight of alkylene glycol represented by the formula (B):

    (B)

(in which x and y is respectively an integer, provided that x is 2 or more and x and y have a relation of $2 \leq x \times y \leq 6$), based on total weight of the ink.

6. An ink of claim 1, further comprising at least one alcohol compound selected from the group consisting of an alkylene glycol and a polyalcohol having three hydroxyl groups, and a lower alkyl ether of alkylene glycol, said alkylene glycol represented by the formula (B):

    (B)

(in which x and y is respectively an integer, provided that x is 2 or more and x and y have a relation of $2 \leq x \times y \leq 6$), a total amount of the alcohol compound, the lower alkyl ether of alkylene glycol and the polyethyleneimine being within the range between 10 and 30% by weight, based on total weight of the ink.

7. An ink of claim 1, further comprising 0.01–2% by weight of alkali metal ethylenediaminetetraacetate, based on total weight of the ink.

8. An ink of claim 1, further comprising 0.01–2% by weight of a mixture of NaOH with at least one compound selected from the group consisting of $NaHCO_3$ and $Na_2B_4O_7$, based on total weight of the ink.

9. An ink of claim 1, further comprising 0.1–15% by weight of an aliphatic alcohol, based on total weight of the ink.

10. An ink of claim 9, in which the aliphatic alcohol has an C1–C5 alkyl group.

11. An ink of claim 1, in which an amphiphilic agent is contained at an amount of 0.01–5% by weight, based on total weight of the ink.

12. An ink of claim 11, in which the amphiphilic agent is selected from the group consisting of an urea, an amide, a cyclic amide, an alkanol amine and a mixture thereof.

13. An ink of claim 1, having a surface tension between 30 and 50 dyn/cm at 25° C.

14. An ink for ink-jetting, comprising:

0.5–10% by weight of a coloring material, 0.01–5.0% by weight of alkylene oxide adduct of acetylene glycol, represented by the formula (A):

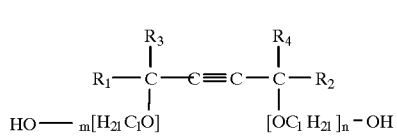    (A)

(in which $R_1$–$R_4$ are respectively an lower alkyl group; "l" is an integer of 2 or 3; and m and n are respectively an integer of 1 or more);

0.01–2% by weight of alkali metal ethylenediaminetetraacetate;

1–30% by weight of butyl ether of triethylene glycol: and water,

% by weight being based on total weight of the ink.

15. An ink of claim 14, further comprising 1–20% by weight of a polyalcohol having three hydroxyl groups based on total weight of the ink.

16. An ink of claim 14, further comprising 1–30% by weight of a lower alkyl ether of alkylene glycol, based on total weight of the ink.

17. An ink of claim 1, further comprising 1–30% by weight of alkylene glycol represented by the formula (B):

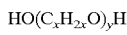    (B)

(in which x and y is respectively an integer, provided that x is 2 or more and x and y have a relation of $2 \leq x \times y \leq 6$), based on total weight of the ink.

18. An ink of claim 14, further comprising polyalkylene glycol having a molecular weight of 150 or more.

19. An ink of claim 14, further comprising at least one alcohol compound selected from the group consisting of an alkylene glycol and a polyalcohol having three hydroxyl groups, and a lower alkyl ether of alkylene glycol, said alkylene glycol represented by the formula (B):

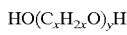    (B)

(in which x and y is respectively an integer, provided that x is 2 or more and x and y have a relation of $2 \leq X \times y \leq 6$), a total amount of the alcohol compound, the lower alkyl ether of alkylene glycol and the polyethyleneimine being within the range between 10 and 30% by weight, based on total weight of the ink.

20. An ink of claim 14, further comprising 0.01–2% by weight of a mixture of NaOH with at least one compound selected from the group consisting of $NaHCO_3$ and $Na_2B_4O_7$, based on total weight of the ink.

21. An ink of claim 14, further comprising 0.1–15% by weight of an aliphatic alcohol, based on total weight of the ink.

22. An ink of claim 21, in which the aliphatic alcohol has an C1–C5 alkyl group.

23. An ink of claim 14, in which an amphiphilic agent is contained at an amount of 0.01–5% by weight, based on total weight of the ink.

24. An ink of claim 23, in which the amphiphilic agent is selected from the group consisting of an urea, an amide, a cyclic amide, an alkanol amine and a mixture thereof.

25. An ink of claim 14, having a surface tension between 30 and 50 dyn/cm at 25° C.

26. An ink for ink-jetting, comprising:

0.5–10% by weight of a coloring material, 0.01–5.0% by weight of alkylene oxide adduct of acetylene glycol, represented by the formula (A):

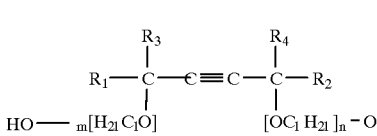    (A)

(in which $R_1$–$R_4$ are respectively an lower alkyl group; "l" is an integer of 2 or 3; and m and n are respectively an integer of 1 or more);

0.01–2% by weight of a mixture of NaOH with at least one compound selected from the group consisting of $NaHCO_3$ and $Na_2B_4O_7$; and water, % by weight being based on total weight of the ink.

27. An ink of claim 26, further comprising 1–20% by weight of a polyalcohol having three hydroxyl groups based on total weight of the ink.

28. An ink of claim 26, further comprising 1–30% by weight of a lower alkyl ether of alkylene glycol, based on total weight of the ink.

29. An ink of claim 26, further comprising 1–30% by weight of alkylene glycol represented by the formula (B):

$$HO(C_xH_{2x}O)_yH \qquad (B)$$

(in which x and y is respectively an integer, provided that x is 2 or more and x and y have a relation of $2 \leq x \times y \leq 6$), based on total weight of the ink.

30. An ink of claim 26, further comprising polyalkylene glycol having a molecular weight of 150 or more.

31. An ink of claim 26, further comprising at least one alcohol compound selected from the group consisting of an alkylene glycol and a polyalcohol having three hydroxyl groups, and a lower alkyl ether of alkylene glycol, said alkylene glycol represented by the formula (B):

$$HO(C_xH_{2x}O)_yH \qquad (B)$$

(in which x and y is respectively an integer, provided that x is 2 or more and x and y have a relation of $2 \leq x \times y \leq 6$), a total amount of the alcohol compound, the lower alkyl ether of alkylene glycol and the polyethyleneimine being within the range between 10 and 30% by weight, based on total weight of the ink.

32. An ink of claim 26, further comprising 0.01–2% by weight of alkali metal ethylenediaminetetraacetate, based on total weight of the ink.

33. An ink of claim 26, further comprising 0.1–15% by weight of an aliphatic alcohol, based on total weight of the ink.

34. An ink of claim 33, in which the aliphatic alcohol has an C1–C5 alkyl group.

35. An ink of claim 26, in which an amphiphilic agent is contained at an amount of 0.01–5% by weight, based on total weight of the ink.

36. An ink of claim 35, in which the amphiphilic agent is selected from the group consisting of an urea, an amide, a cyclic amide, an alkanol amine and a mixture thereof.

37. An ink of claim 26, having a surface tension between 30 and 50 dyn/cm at 25° C.

* * * * *